United States Patent
Bonacini

(10) Patent No.: US 9,132,706 B2
(45) Date of Patent: Sep. 15, 2015

(54) DEVICE FOR LOCKING WHEEL RIMS FOR VEHICLES ON REPAIR WORKSHOP MACHINES, PARTICULARLY TYRE-CHANGING MACHINES OR THE LIKE

(75) Inventor: Maurizio Bonacini, Correggio (IT)

(73) Assignee: GIULIANO GROUP S.P.A., Correggio (RE) (IT)

( * ) Notice: Subject to any disclaimer, the term of this patent is extended or adjusted under 35 U.S.C. 154(b) by 475 days.

(21) Appl. No.: 13/551,082

(22) Filed: Jul. 17, 2012

(65) Prior Publication Data

US 2013/0025797 A1   Jan. 31, 2013

(30) Foreign Application Priority Data

Jul. 26, 2011 (IT) .............................. MO2011A0185

(51) Int. Cl.
| | |
|---|---|
| B60C 25/138 | (2006.01) |
| B60B 30/06 | (2006.01) |
| B60C 25/05 | (2006.01) |
| G01M 1/04 | (2006.01) |

(52) U.S. Cl.
CPC .............. B60C 25/138 (2013.01); B60B 30/06 (2013.01); B60C 25/0542 (2013.04); G01M 1/045 (2013.01)

(58) Field of Classification Search
CPC   B60C 25/0545; B60C 25/132; B60C 25/138; G01M 17/021; B60B 30/06; B60Y 2200/11
USPC ..................... 157/1.1, 1.26, 14, 16, 18, 20, 21
See application file for complete search history.

(56) References Cited

U.S. PATENT DOCUMENTS

| 5,615,574 A | 4/1997 | Drechsler | |
|---|---|---|---|
| 6,516,855 B2 * | 2/2003 | Corghi | ............................ 157/14 |

FOREIGN PATENT DOCUMENTS

| DE | 2361847 | 6/1974 |
|---|---|---|
| DE | 3641295 | 6/1988 |
| DE | 29809051 | 10/1998 |
| EP | 2218591 | 8/2010 |

OTHER PUBLICATIONS

Italian Search report dated Feb. 16, 2012, in corresponding Italian Application MO2011A000185.

* cited by examiner

*Primary Examiner* — Robert Scruggs
(74) *Attorney, Agent, or Firm* — Young & Thompson

(57) ABSTRACT

A device (1) for locking wheel rims for vehicles on repair workshop machines, particularly tire-changing machines or the like, includes a fastening apparatus (2) associable in a removable way with at least a supporting arrangement (B) of the rim of a wheel (A) in a vehicle repair workshop machine or the like, a stop element (3) engageable on a rim arranged on the supporting arrangement (B) for locking the rim itself and a simultaneous movement apparatus (4) associated with the fastening apparatus (2) and with the stop element (3) and suitable for simultaneously moving the fastening apparatus (2) and the stop element (3) between a release configuration, wherein the fastening apparatus is released from the supporting arrangement and the stop element is substantially disengaged from the rim, and a locking configuration, wherein the fastening apparatus is associated with the supporting arrangement and the stop element is engaged on the rim.

15 Claims, 4 Drawing Sheets

_US 9,132,706 B2_

DEVICE FOR LOCKING WHEEL RIMS FOR VEHICLES ON REPAIR WORKSHOP MACHINES, PARTICULARLY TYRE-CHANGING MACHINES OR THE LIKE

BACKGROUND OF THE INVENTION

The present invention relates to a device for locking wheel rims for vehicles on repair workshop machines, particularly tyre-changing machines or the like.

DESCRIPTION OF THE RELATED ART

The use is known of so-called tyre-changing machines which allow fitting and removing tyres onto and off the relative rim of a vehicle wheel, e.g., for carrying out maintenance jobs or replacing the rim and/or the tyre itself.

Such tyre-changing machines generally consist of a base structure supporting gripping and rotating means for gripping and rotating the rim of a wheel, having a device for locking the rim, and of at least a tool bearing arm having one or more tools suitable for removing and/or fitting the tyre from and onto the rim. Different known types of gripping and rotating means for gripping and rotating the rim exist, having different devices for locking the rim.

A first type consists of a fastening plate for the rim, which is fitted on the base structure of the tyre-changing machine in a rotatable way around a central work axis and which has four rim gripping clamps.

The clamps are moving from the centre towards the outside of the plate and vice versa, between a closing configuration, corresponding to the positioning of the clamps at the centre of the plate, and an opening configuration, corresponding to the positioning of the clamps at the edge of the plate.

Such type of locking is not without drawbacks.

In particular, the clamps are subject to breakage and also the actuators for moving the clamps themselves are subject to faults.

A second type of gripping and rotating means comprises a resting plate for the rim, which is fitted on the base structure of the tyre-changing machine in a way rotatable around a central work axis, by means of the operation of suitable motor means.

The resting plate has a threaded hole inside which a rim locking pin can be fitted and screwed.

The locking pin has a thread along its entire length or a part of it and has, in particular, an extremal portion that can be fitted and screwed inside the hole on the resting plate, through the central through hole on the rim, and a grip opposite such extremal portion.

To the pin is coupled, axially rotatable, a locking cone, generally having suitable grip knobs, suitable for engaging on the rim in correspondence to the central through hole for the locking of the rim itself on the resting plate.

During use, the rim is positioned on the resting plate, with the central hole of the rim aligned with the threaded hole on the plate.

The above extremal portion of the pin is screwed inside the hole on the plate, until the cone is positioned in contact or in any way in the proximity of the rim, above this.

The screwing up of the cone on the pin, obtained by means of the knobs, allows positioning the cone itself in contact with the rim, inside the through hole, and therefore allows locking the rim on the resting plate.

This type of chuck does however have a number of drawbacks.

In particular, the action of locking the rim on the resting plate must be done manually, by screwing the pin inside the threaded hole and, eventually, of the cone on the rim itself, and demands considerable physical effort and time on the part of the operator.

To overcome this problem, a further type of gripping and rotating means is known comprising a support fitted to the base of the machine that extends substantially vertically and has a resting plate of the rim rotating by means of the operation of motor means.

The resting plate has a hole for the introduction of the extremal section of a locking element of the rim.

In particular, the locking element is made up of a pin with an extremity having a grip and the opposite extremity with at least a first fastening element which is associable in a removable way with a corresponding second fastening element inside the channel which can be accessed to through the hole on the plate.

The pin can be associated e.g. in a removable way inside the channel by means of a so-called bayonet coupling or the like.

In particular, the pin can have at least a first shoulder which can be coupled to one or more corresponding second shoulders made on several points on the inner surface of the channel.

To the pin is coupled axially rotating a locking cone, generally having suitable grip knobs, suitable for engaging on the rim in correspondence to the central through hole for locking the rim itself on the resting plate.

During use, the rim is positioned on the resting plate, with the rim central hole aligned with the hole on the plate.

The pin is fitted in the hole on the resting plate and the first shoulder on the extremal portion of the pin is coupled to one of the second shoulders inside the channel, so as to position the cone as close as possible to the rim, above this.

The screwing up of the cone on the pin, made by turning the knobs, allows to position the cone itself in contact with the rim, inside the through hole and allows, therefore, the locking of the rim on the resting plate.

Also these gripping and rotating means do however have a number of drawbacks.

In particular, the locking of the rim on the resting plate requires, first of all, the correct coupling between the extremity of the pin and one of the corresponding fastening elements in the channel, so as to position the cone as close as possible to the rim; then, the operator must screw up the cone until the complete locking of the rim.

The locking of the rim, therefore, implies the execution of two distinct operations by the operator which prove to be long in terms of time.

Moreover, the coupling operation between the extremity of the pin and one of the corresponding fastening elements in the channel is not always immediate and it is not always easy for the operator to perform such operation so as to move the locking cone as close as possible to the rim.

SUMMARY OF THE INVENTION

The main aim of the present invention is to provide a device for locking wheel rims for vehicles on repair workshop machines, particularly tyre-changing machines or the like, that allows to make the locking operation of the rim easier. Another object of the present invention is to provide a device for locking wheel rims for vehicles on repair workshop machines, particularly tyre-changing machines or the like, that allows to overcome the mentioned drawbacks of the state of the art in the ambit of a simple, rational, easy and effective to use as well as low cost solution.

The above objects are achieved by the present device for locking wheel rims for vehicles on repair workshop machines, particularly tyre-changing machines or the like comprising at least a fastening apparatus associable in a removable way with at least a supporting arrangement of the rim of a wheel in a vehicle repair workshop machine or the like, at least a stop element engageable on a rim arranged on said supporting arrangement for locking the rim itself, at least a simultaneous movement apparatus associated with said fastening apparatus and with said stop element and suitable for simultaneously moving said fastening apparatus and said stop element between a release configuration, wherein said fastening apparatus is released from said supporting arrangement and said stop element is substantially disengaged from said rim, and a locking configuration, wherein said fastening apparatus is associated with said supporting arrangement and said stop element is engaged on said rim.

BRIEF DESCRIPTION OF THE DRAWING FIGURES

Other characteristics and advantages of the present invention will become more evident from the description of a preferred, but not sole, embodiment of a device for locking wheel rims for vehicles on repair workshop machines, particularly tyre-changing machines or the like, illustrated purely as an example but not limited to the annexed drawings in which.

With particular reference to such figures, globally indicated by 1 is a device for locking wheel rims for vehicles on repair workshop machines or the like.

DETAILED DESCRIPTION OF THE INVENTION

Figure 1:
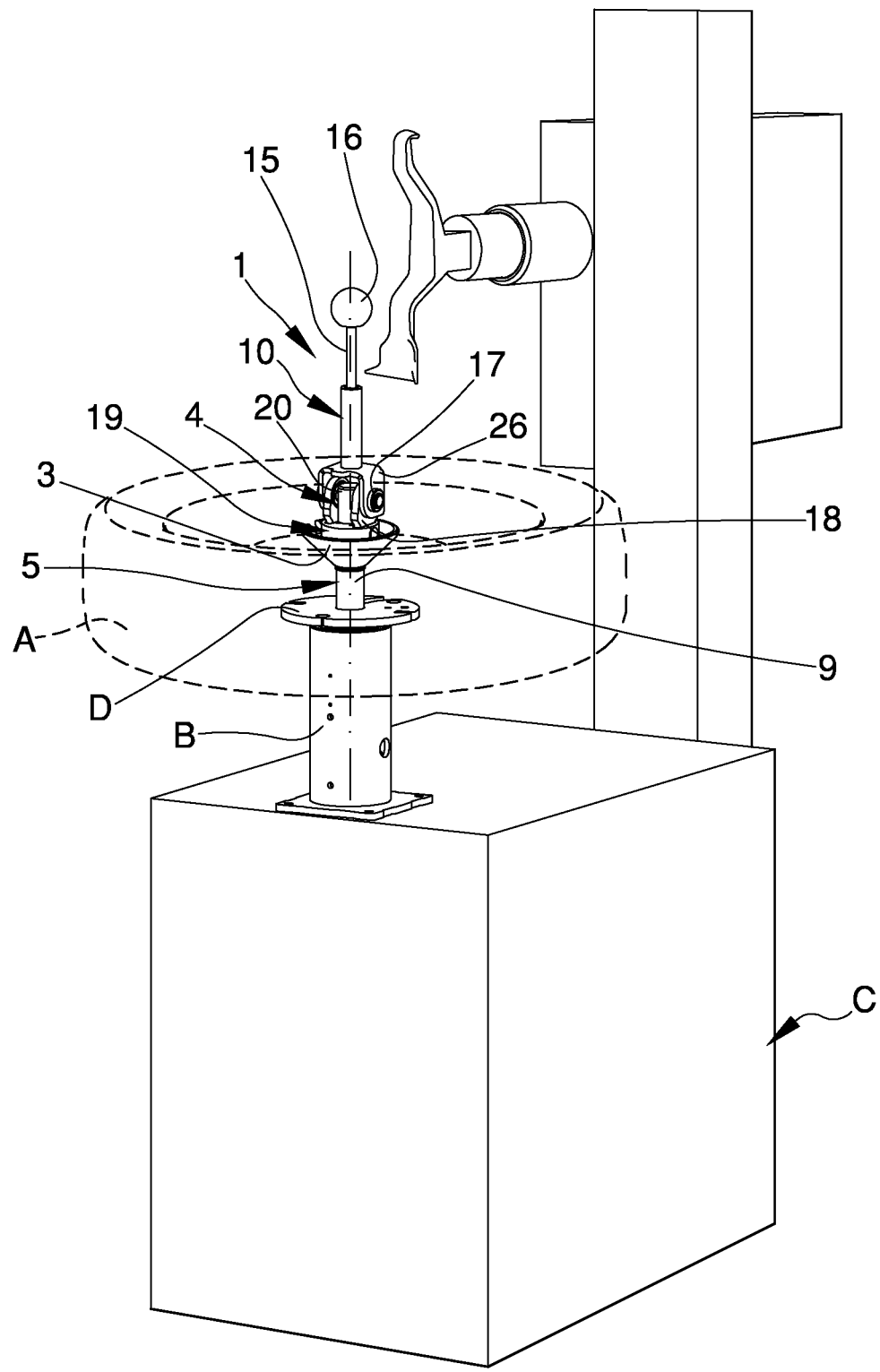
FIG. 1 is an axonometric view of the device according to the invention fitted onto a tyre-changing machine of conventional type.
Figure 2:
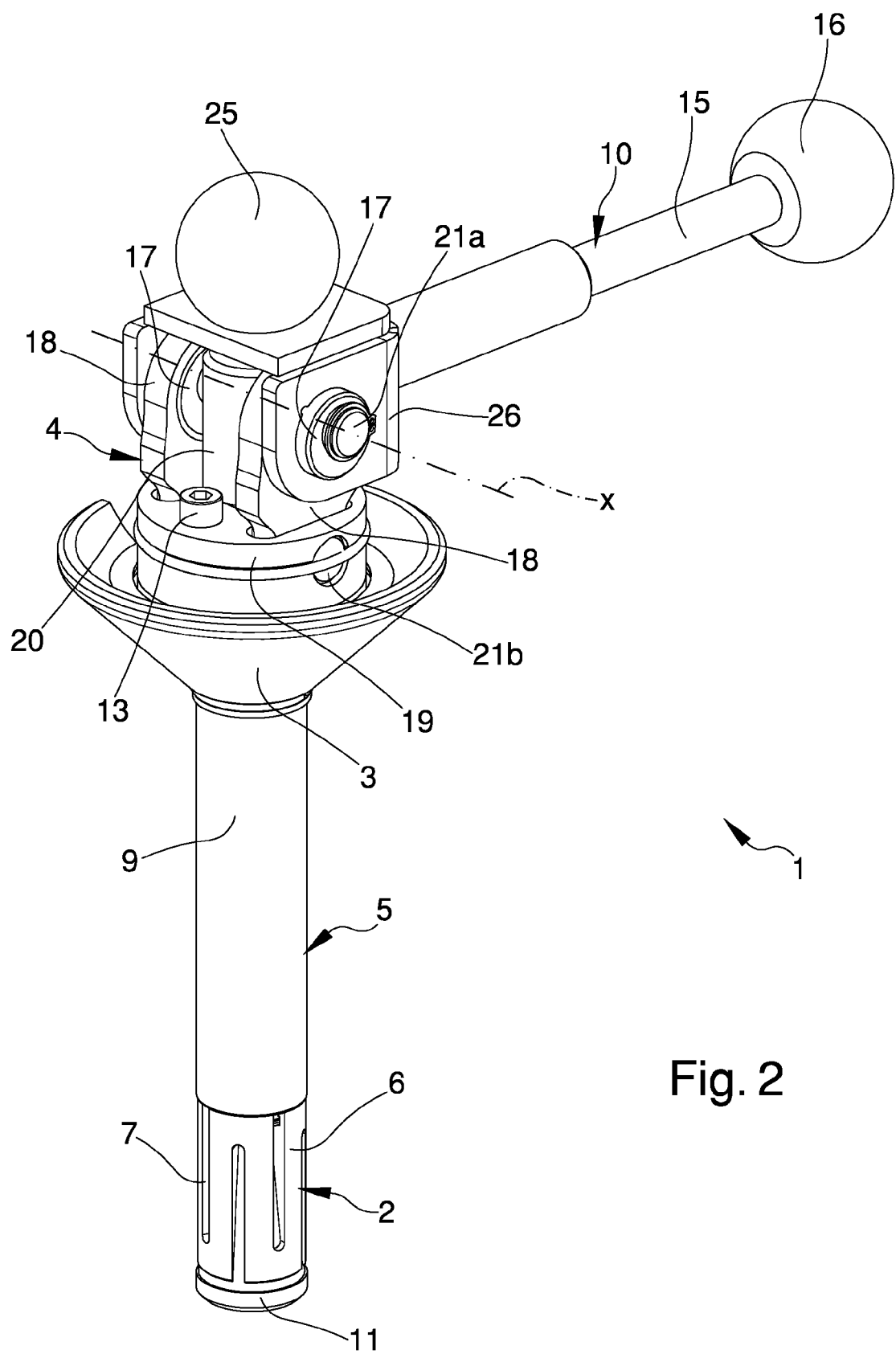
FIG. 2 is an axonometric view of the device according to the invention.

As shown in FIG. 1, the device 1 can be used to lock the rim of a wheel A on a supporting arrangement B of a conventional tyre-changing machine C.

The supporting arrangement B, in particular, can be made of means for gripping and rotating the rim of a wheel A conventionally used on a tyre-changing machine C, having a plate D which is suitable for accommodating the rim in support and which is suitable for being placed in rotation by suitable motor means of the tyre-changing machine C.

The device 1 comprises a fastening apparatus 2 associable in a removable way with the supporting arrangement B and a stop element 3 engageable on the rim, in turn arranged on the supporting arrangement B, for locking the rim itself. Advantageously, the device 1 comprises simultaneous movement means, indicated altogether in the illustrations by the reference 4, associated with the fastening apparatus 2 and with the stop element 3.

In particular, the simultaneous movement apparatus 4 is suitable for simultaneously moving both the fastening apparatus 2 and the stop element 3 between a release configuration, wherein the fastening apparatus 2 is released from the supporting arrangement B and the stop element 3 is substantially disengaged from the rim, and the locking configuration, wherein the fastening apparatus 2 is anchored to the supporting arrangement B and the stop element 3 is engaged on the rim.

This way, an operator can lock the rim on the supporting arrangement B in a simple and immediate way, by means of a single operation.

With particular reference to the embodiment shown in the illustrations, the device 1 comprises an extremal section 5 of elongated shape which can be fitted with play in a corresponding housing E on the supporting arrangement B of the rim, through a specific hole made on the plate D.

Different embodiments of the device 1 cannot however be ruled out.

The fastening apparatus 2 is made in correspondence to the free extremity of the extremal section 5, so as to allow the locking of the extremal section itself inside the housing E on the supporting arrangement B.

In particular, with reference to the embodiment of the device 1 shown in the illustrations, the fastening apparatus 2 comprises an expansion clamp element 6 made along a portion of the extremal section 5 and suitable for being expanded to engage on the inner surface of the housing E in the above locking configuration.

The use of several expansion clamping elements 6 cannot however be ruled out, made along respective portions of the extremal section 5.

Usefully, the expansion clamp element 6 can consist of an elastic band which, in the specific embodiment shown in the illustrations, is made by means of a spring made up of a closed metal band having cross cuts 7.

In practice, once expanded, the elastic band 6 presses on the inner surface of the housing E, blocking the extremal section 5 inside the housing itself and, therefore, anchoring the entire device 1 to the supporting arrangement B.

The extremal section 5 has a substantially tubular and elongated shape.

In particular, the extremal section 5 comprises a tubular element 9 and an elastic band 6 arranged in correspondence to the free extremity of the extremal section 5 and coaxially with respect to the tubular element 9.

Different embodiments of the fastening apparatus 2 cannot be ruled out, nor different types, number and arrangement of the expansion clamping elements 6. The stop element 3 has a substantially truncated-cone shape and is intended to engage on the rim arranged on the supporting arrangement B, in correspondence to the central hole of the rim itself.

In particular, the tubular element 9 is fitted in a through hole made on the stop element 3 and extends from the portion of the stop element 3 meant to engage on the edge of the central hole of the rim.

Different shapes and different arrangements of the stop element 3 cannot however be ruled out.

The simultaneous movement apparatus 4 comprises a control device indicated altogether in the illustrations by the reference 10, associated with the fastening apparatus 2 and the stop element 3.

Figure 3:
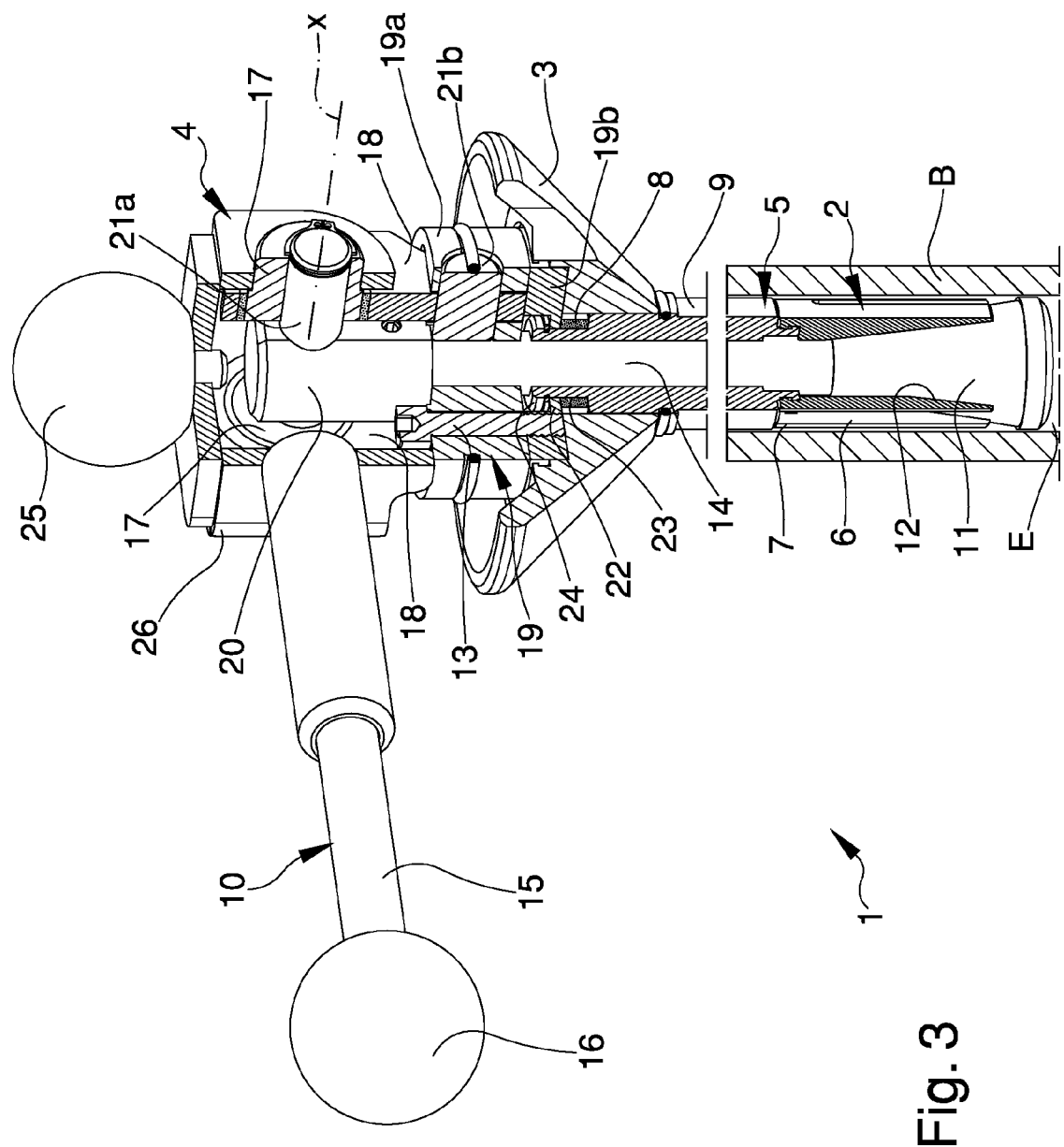
FIG. 3 is a partial section view of the device according to the invention with the fastening apparatus and the stop element in the release configuration.
Figure 4:
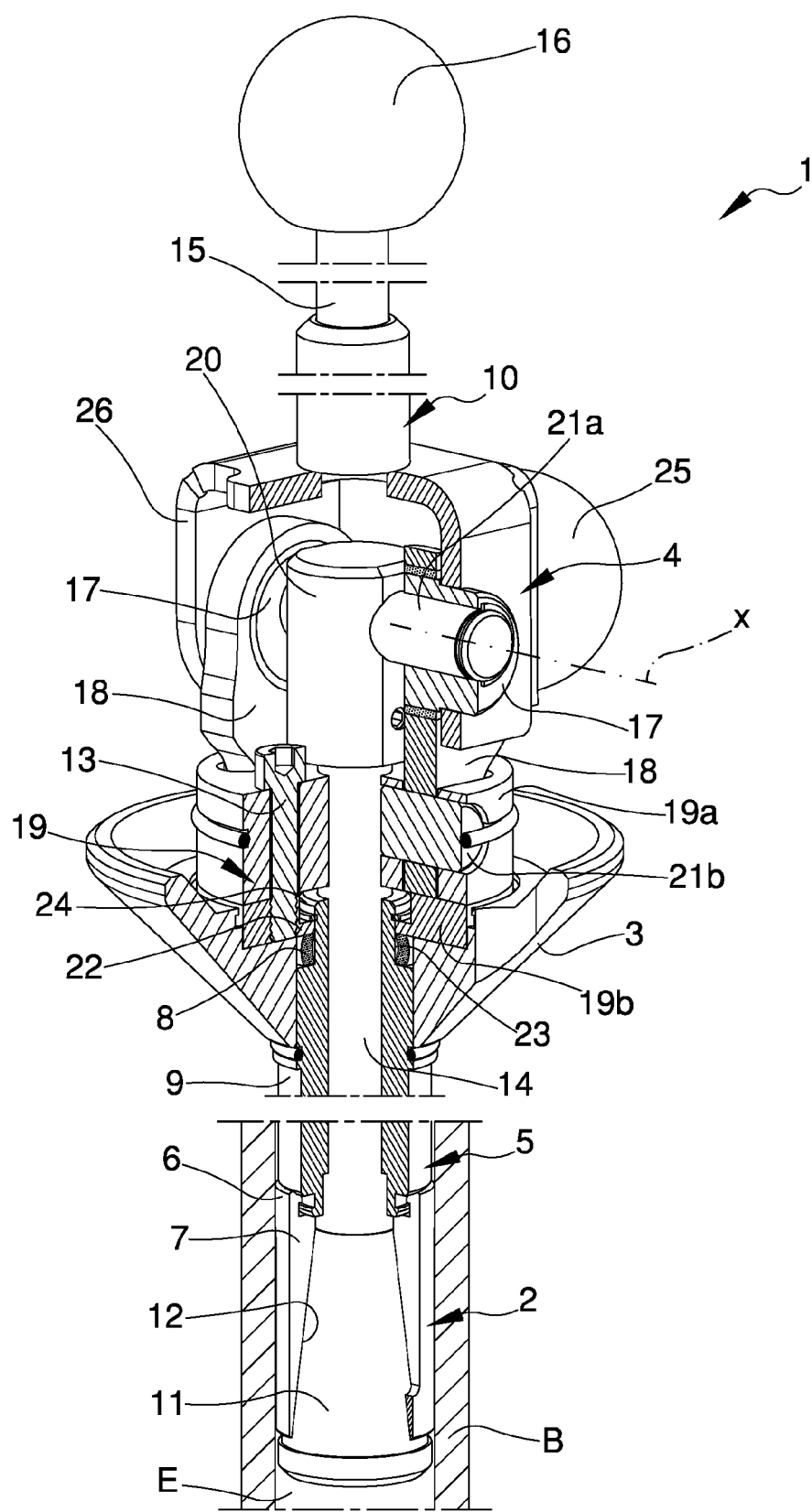
FIG. 4 is a partial section view of the device according to the invention with the fastening apparatus and the stop element in the locking configuration.

In particular, the control device 10 can be positioned between an idle position, shown in FIG. 3, wherein the fastening apparatus 2 and the stop element 3 are in the release configuration, and a working position, shown in FIG. 4, wherein the fastening apparatus 2 and the stop element 3 are in locking configuration. The simultaneous movement apparatus 4 comprises expansion means 11 associated with the elastic band 6 and suitable for expanding and reducing such elastic band 6 to move it from the release configuration to the locking configuration and vice versa.

Usefully, the expansion means 11 are made up of a truncated-cone element fitted axially sliding inside the elastic band 6 and engaged sliding on the inner surface of the elastic band itself.

The truncated-cone element 11 moves between an idle position, shown in FIG. 3, wherein the elastic band 6 is in the release configuration, and a working position, shown in FIG. 4, wherein the elastic band 6 is in the locking configuration.

In particular, the elastic band 6 has a sloped inner surface 12 on which the outer surface of the truncated-cone element 11 engages sliding.

Consequently, the axial movement of the truncated-cone element 11 allows varying the diameter of the elastic band 6 in a uniform way, along the entire length of the elastic band itself.

The simultaneous movement apparatus 4 comprises a connection element 14 of elongated shape which connects the control device 10 to the expansion means 11.

With particular reference to the embodiment of the device 1 shown in the illustrations, the connection element 14 is made up of a rod fitted axially sliding inside the extremal section 5.

The rod 14 has an extremity associated with the control device 10 and an opposite extremity provided with the truncated-cone element 11.

In particular, the rod 14 is fitted axially sliding inside the tubular element 9 and is provided with the truncated-cone element 11 in correspondence to the elastic band 6.

The rod 14 is axially sliding inside the extremal section 5 by means of the operation of the control device 10 between an extracted position, shown in FIG. 3, wherein the control device 10 and the truncated-cone element 11 are in their respective idle positions, and a retracted position, shown in FIG. 4, wherein the control device 10 and the truncated-cone element 11 are in the respective working positions.

Advantageously, the control device 10 is composed of an eccentric lever device or similar device.

Different types and shapes of the control device 10 cannot however be ruled out.

With particular reference to the embodiment of the device 1 shown in the illustrations, the control device 10 comprises a lever 15 having, at one extremity a grip 16 and, at the opposite extremity, a pair of cams 17.

Usefully, the lever 15 is made up of a telescopic arm which can be extended to facilitate locking/release operations, while the grip 16 at the free extremity of the lever 15 is made up of a knob.

The cams 17 are associated with the stop element 3 and are rotatable by means of the rotation of the lever 15 between an idle position, shown in FIG. 3, and the working position, shown in FIG. 4, to move the stop element 3 between the release configuration and the locking configuration respectively.

In particular, each of the cams 17 is housed revolving inside respective connecting rods 18.

Each of the connecting rods 18, in turn, is hinged to a pusher element 19 of cylindrical shape arranged in contact with the stop element 3.

In particular, the pusher element 19 is in part housed to measure in a respective recess obtained on the portion of the stop element 3 opposite the portion suitable for being moved into contact with the rim.

Consequently, the rotation of the cams 17 allows moving the connecting rods 18, the pusher element 19 and therefore the stop element 3 between the above release and locking configurations.

Usefully, the device 1 has an elastic element 8 placed between the stop element 3 and the fastening apparatus 2 suitable for being compressed during the movement of the stop element 3 from the release configuration to the locking configuration and suitable for releasing the elastic energy accumulated during the return of the pusher element 19 from the locking configuration to the release configuration.

In particular, such elastic element 8 is suitable for permitting a relative axial movement between the stop element 3 and the fastening apparatus 2.

The pusher element 19 has a transit hole for the rod 14.

Usefully, the extremity of the tubular element 9 opposite the elastic band 6 is fitted sliding inside the transit hole obtained on the pusher element 19.

In particular, inside this transit hole, the pusher element 19 has a protrusion 22 suitable for engaging on a locator 24 on the outer surface of the tubular element 9 during movement from the locking configuration to the release configuration. This way, during such movement, the pusher element 19 drags the tubular element 9 upwards and this, in turn, drags the elastic band 6 upwards, forcing the movement of the elastic band itself from the locking configuration to the release configuration.

In particular, the protrusion 22 is fitted inside a specific annular groove 23 obtained on the outer surface of the tubular element 9.

Usefully, the elastic element 8 is composed of a seal arranged around the tubular element 9 and housed inside the groove 23.

The protrusion 22 is suitable for compressing the seal 8 during the movement of the pusher element 19 from the release configuration to the locking configuration.

With particular reference to the embodiment of the device 1 shown in the illustrations, the pusher element 19 is composed of a first disc 19a and of a second disc 19b.

To the first disc 19a are hinged the lower extremities of the connecting rods 18, around a second pin 21b.

The second disc 19b is fastened integral to the first disc 19a by means of threaded means 13 of the type of one or more screws.

The second disc 19b is coupled with the tubular element 9 by means of the protrusion 22 and is positioned in contact with the stop element 3.

Usefully, each of the cams 17 is associated rotatable with the rod 14, around a rotation axis X substantially at right angles with the longitudinal axis of the rod itself, and is revolving by means of the rotation of the lever 15 between the idle position, shown in FIG. 3, and the working position, shown in FIG. 4, to move the rod 14 between the extracted position and the retracted position respectively.

In particular, the extremity of the rod 14 opposite the extremity provided with the truncated-cone element 11 is fitted and fixed inside a bush 20.

The cams 17 are associated rotatable with a first pin 21a fitted in the bush 20 along the rotation axis X at right angles with respect to the longitudinal axis of the rod 14.

Consequently, the rotation of the cams 17 permits the translation of the first pin 21a and therefore of the bush 20 and of the rod 14 between the above extracted and retracted positions.

Usefully, the device 1 comprises an additional grip knob 25 fastened to a bracket 26 supporting the lever 15.

The operation of the device 1 is described below.

The device 1 is initially in the configuration shown in the FIG. 3, with the fastening apparatus 2 and the stop element 3 in the release configuration.

Once the rim of the wheel A has been positioned on the supporting arrangement B of the tyre-changing machine C, the operator inserts the extremal section 5 inside the respective housing E on the supporting arrangement B, through the central hole on the rim.

Subsequently, by means of a single operation, the operator moves the lever 15 between the idle position and the working position, moving the device to the configuration shown in FIG. 4, wherein the fastening apparatus 2 and the stop element 3 are in the locking configuration.

In particular, during such movement of the lever 15, the rotation of the cams 17 forces the elevation of the rod 14, moving it from the extracted position to the retracted position.

The movement of the rod towards the retracted position moves the truncated-cone element 11, which pushes on the sloped inner surfaces of the elastic band 6 and expands the elastic band until this is brought into contact with the inner surface of the housing E.

At the same time, the rotation of the cams 17 pushes the pusher element 19 downwards and, consequently, pushes downwards the stop element 3, which engages on the rim, in correspondence to the edge of the central hole. Consequently, in the configuration of the device 1 shown in the FIG. 4, the fastening apparatus 2 blocks the extremal section 5 inside the housing E and the stop element 3 presses on the rim, allowing the perfect locking of the rim itself on the supporting arrangement B of the tyre-changing machine C.

It has in point of fact been ascertained how the described invention achieves the proposed objects.

In particular, the fact is underlined that the device according to the invention allows locking the rim on a workshop machine by means of a single operation, making such locking operation much simpler and quicker to perform compared to devices of known type.

The invention claimed is:

1. Device (1) for locking wheel rims for vehicles on repair workshop machines, including tyre-changing machines, comprising at least a fastening apparatus (2) associable in a removable way with at least a supporting arrangement (B) of the rim of a wheel (A) in a vehicle repair workshop machine or the like, at least a stop element (3) engageable on a rim arranged on said supporting arrangement (B) for locking the rim itself, at least a simultaneous movement apparatus (4) associated with said fastening apparatus (2) and with said stop element (3) and suitable for simultaneously moving said fastening apparatus (2) and said stop element (3) between a release configuration, wherein said fastening apparatus (2) is released from said supporting arrangement (B) and said stop element (3) is substantially disengaged from said rim, and a locking configuration, wherein said fastening apparatus (2) is associated with said supporting arrangement (B) and said stop element (3) is engaged on said rim, at least an extremal section (5) of substantially elongated shape which can be fitted in a corresponding housing (E) on said supporting arrangement (B) of the rim, and wherein said fastening apparatus (2) comprises at least an expansion clamp element (6) made along at least a portion of said extremal section (5) and suitable for being expanded to engage on the inner surface of said housing (E) in said locking configuration.

2. Device (1) according to the claim 1, wherein said expansion clamp element (6) comprises at least an elastic band (6) or the like.

3. Device (1) according to claim 1, wherein said stop element (3) is substantially truncated-cone-shaped and is intended to engage on said rim, in correspondence to the central through hole of said rim.

4. Device (1) according to claim 1, wherein said simultaneous movement apparatus (4) comprises at least a control device (10) associated with said fastening apparatus (2) and with said stop element (3) and which can be positioned between an idle position, wherein said fastening apparatus (2) and said stop element (3) are in said release configuration, and a working configuration, wherein said fastening apparatus (2) and said stop element (3) are in said locking configuration.

5. Device (1) according to the claim 1, wherein said simultaneous movement apparatus (4) comprises expansion means (11) associated with said expansion clamp element (6) and suitable for expanding and reducing said expansion clamp element (6) to move it between said release configuration and said locking configuration.

6. Device (1) according to the claim 5, wherein said expansion clamp element (6) comprises at least an elastic band (6) or the like and said expansion means (11) comprise at least a truncated-cone element (11) fitted axially sliding inside said elastic band (6), engaged sliding on at least a part of the inner surface of said elastic band (6) and moving between an idle position, wherein said elastic band (6) is in said release configuration and a working position, wherein said elastic band (6) is in said locking configuration.

7. Device (1) according to the claim 6, wherein said elastic band (6) has a sloped inner surface (12) on which the outer surface of said truncated-cone element (11) is engaged sliding.

8. Device (1) according to claim 6, wherein said extremal section (5) has a substantially tubular and elongated shape and comprises said elastic band (6) along at least one of its portions.

9. Device (1) according to claim 5, wherein said simultaneous movement apparatus (4) comprises at least a control device (10) associated with said fastening apparatus (2) and with said stop element (3) and which can be positioned between an idle position, wherein said fastening apparatus (2) and said stop element (3) are in said release configuration, and a working configuration, wherein said fastening apparatus (2) and said stop element (3) are in said locking configuration, and wherein said simultaneous movement apparatus (4) comprises at least a connection element (14) between said control device (10) and said expansion means (11).

10. Device (1) according to claim 9, wherein said connection element (14) has a substantially elongated shape, is fitted axially sliding inside said extremal section (5), has an extremity associated with said control device (10) and an opposite extremity with said expansion means (11), said connection element (14) being axially sliding by means of the operation of said control device (10) and with respect to said extremal section (5) between an extracted position, wherein said control device (10) and said truncated-cone element (11) are in the respective idle positions, and a retracted position, wherein said control device (10) and said truncated-cone element (11) are in the respective working positions.

11. Device (1) according to claim 9, wherein said control device (10) comprises at least an eccentric lever device or the like.

12. Device (1) according to claim 11, wherein said control device (10) comprises at least a lever (15) and at least a cam (17) or the like associated integral with said lever (15).

13. Device (1) according to claim 12, wherein said cam (17) is operatively associated with at least a pusher element (19) of said stop element (3) and is associated revolving with said connection element (14), around a rotation axis which is substantially transversal to the longitudinal axis of said connection element (14), said cam (17) being revolving by means of the rotation of said lever (15) between said idle position and said working position to move said stop element (3) between said release configuration and said locking configuration and to move said connection element (14) between said extracted position and said retracted position.

14. Device (1) according to claim 1, comprising at least an elastic element (8) placed between said stop element (3) and said fastening apparatus (2), said elastic element being suitable for pressing during the movement of said stop element (3) from said release configuration to said locking configuration and being suitable for decompressing during the return of said stop element (3) from said locking configuration to said release configuration.

15. Device (1) according to claim 2, wherein said stop element (3) is substantially truncated-cone-shaped and is intended to engage on said rim, in correspondence to the central through hole of said rim.

\* \* \* \* \*